March 19, 1968     F. E. FLADER     3,373,652
EDUCATIONAL POLARISCOPE APPARATUS FOR DETERMINING AND
OBSERVING STRESS IN PHOTOELASTIC MATERIALS
Original Filed Aug. 7, 1963     3 Sheets-Sheet 1
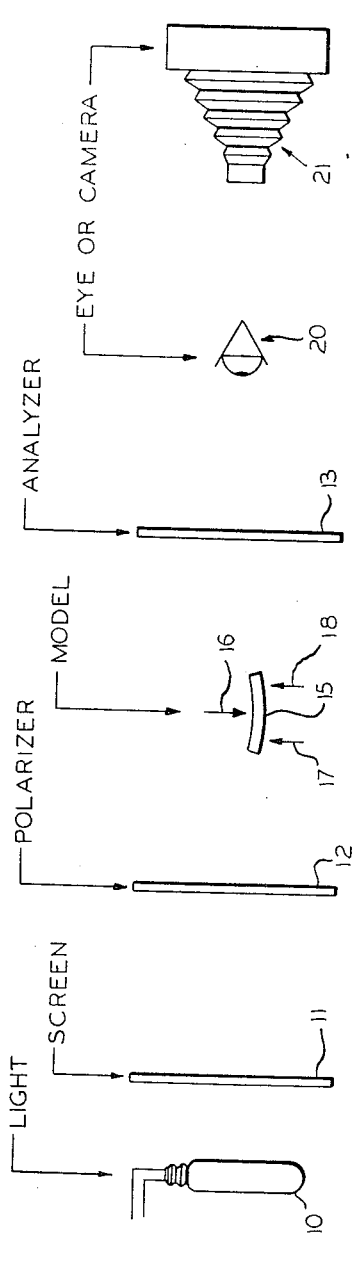
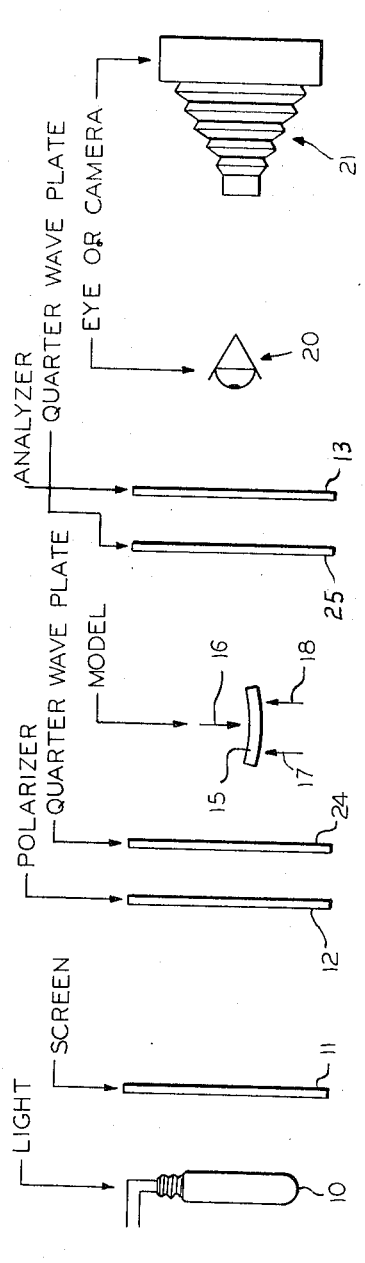
*INVENTOR.*
FREDRIC E. FLADER
BY
ATTORNEYS

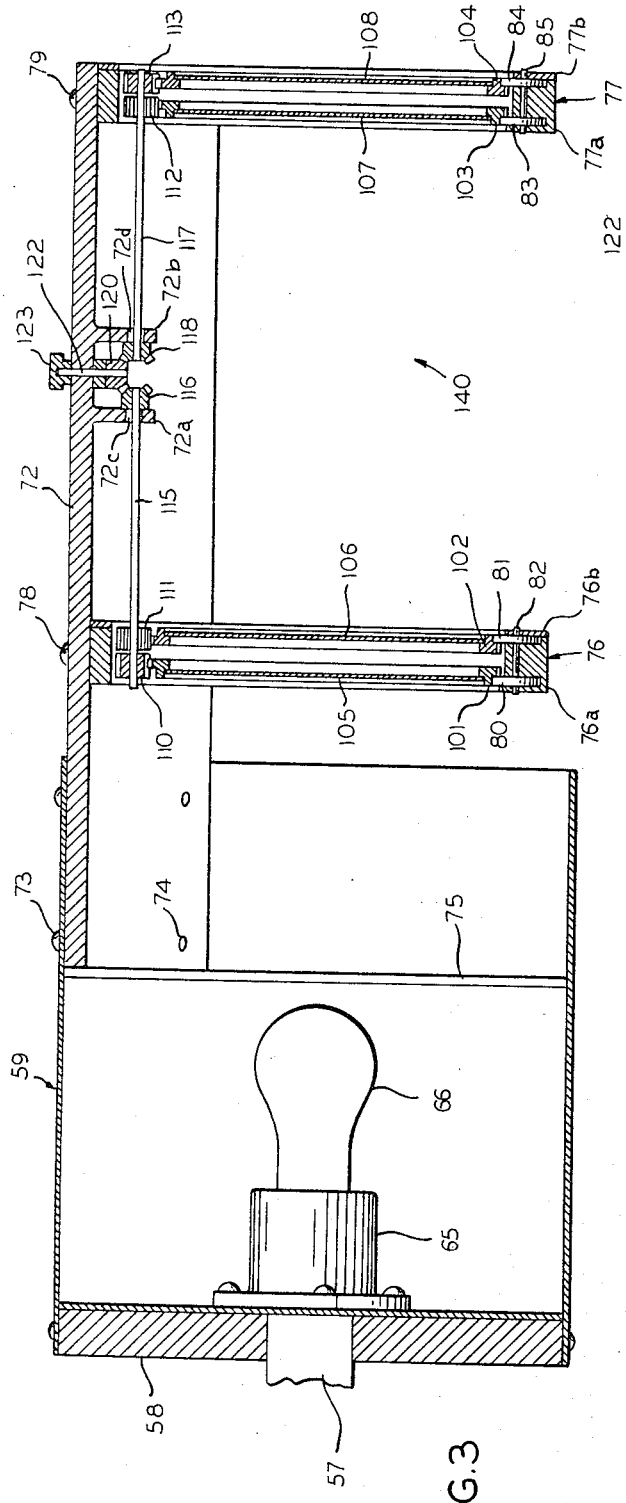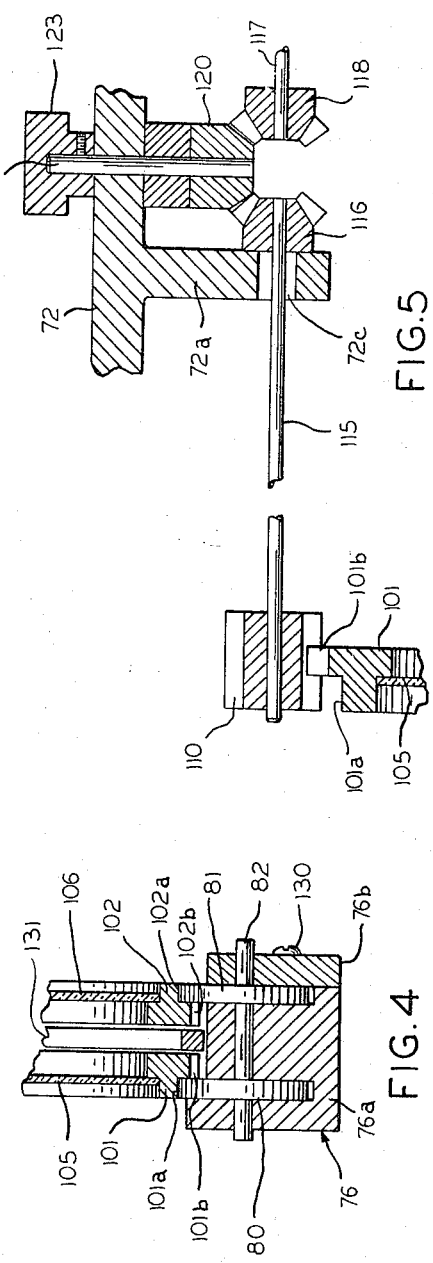

March 19, 1968  F. E. FLADER  3,373,652
EDUCATIONAL POLARISCOPE APPARATUS FOR DETERMINING AND
OBSERVING STRESS IN PHOTOELASTIC MATERIALS
Original Filed Aug. 7, 1963  3 Sheets-Sheet 3

INVENTOR.
FREDRIC E. FLADER
BY
ATTORNEYS

United States Patent Office 3,373,652
Patented Mar. 19, 1968

3,373,652
EDUCATIONAL POLARISCOPE APPARATUS FOR DETERMINING AND OBSERVING STRESS IN PHOTOELASTIC MATERIALS
Fredric E. Flader, Boca Raton, Fla., assignor to Scott Engineering Sciences Corp., Pompano Beach, Fla., a corporation of Florida
Continuation of application Ser. No. 300,503, Aug. 7, 1963. This application June 29, 1967, Ser. No. 655,986
4 Claims. (Cl. 88—14)

ABSTRACT OF THE DISCLOSURE

A device designed primarily for use as an aid to education in demonstrating the effects of stress in photoelastic material through which materials polarized light is passed at predetermined angles with respect to the stress being applied to the photoelastic material. The polariscope is designed for mobile laboratory use on a wide variety of materials with an almost infinite adjustment of polarizer and quarter wave plates are possible with respect to the photoelastic material.

---

This application is a continuation of my copending application 300,503, filed Aug. 7, 1963, now abandoned.

This invention relates to a device utilizing polarized light for determining stress in photoelastic materials and particularly to such a device for association with educational apparatus for testing and measuring stress forces as disclosed in my copending application Ser. No. 257,962 filed Feb. 12, 1963, now abandoned, and for use in conjunction with educational apparatus for testing of materials as disclosed in my copending application Ser. No. 251,171 filed Jan. 14, 1963, now abandoned.

It is an object of the present invention to provide a device for determining stress in photoelastic materials which is particularly adapted for use for educational purposes.

It is another object of the present invention to provide a device utilizing polarized light for determining stress which is conveniently operated by students and which is readily placed in operative relation to structural models in a test fixture.

It is a further object of the invention to provide a device utilizing polarized light for determining stress in photoelastic materials which provides for simple and accurate adjustment of the polarizing components of the apparatus and which is capable of providing both plane and circularly polarized light.

Other objects, features and advantages of the present invention will be apparent from the following detailed description taken in connection with the accompanying drawings in which:

FIGURES 1 and 2 are diagrammatic views for explaining the operation of the device utilizing plane polarized light and circularly polarized light, respectively;

FIGURE 3 is a partial vertical sectional view illustrating a polariscope device in accordance with the present invention;

FIGURE 4 is a fragmentary enlarged view showing certain details of the device of FIGURE 3;

FIGURE 5 is an enlarged fragmentary view illustrating other details of the embodiment of FIGURE 3;

Figure 6:
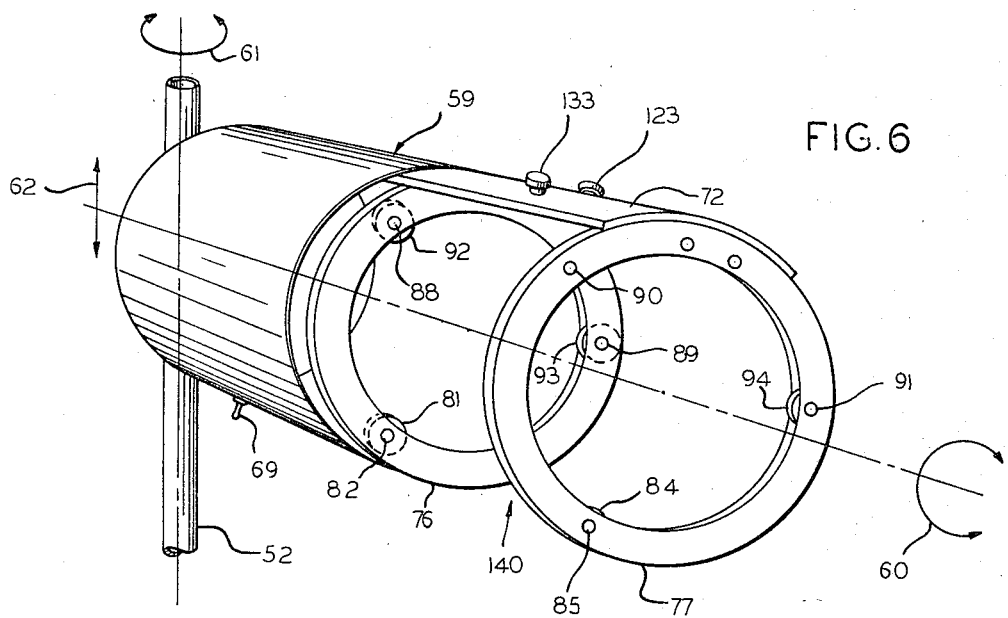
FIGURE 6 is a perspective view of the device of FIGURE 3.

In my prior copending applications Ser. Nos. 251,171 and 257,962, now abandoned, the method of test and experimentation is generally to apply loads and measure corresponding deflections from which curves are plotted defining the load deflection characteristics of the specimen or structural model within the elastic limits of the materials. In addition to this, the yield points and ultimate strengths are determined in cases where the loading is carried beyond the elastic limit. The most usual strength characteristics of a material which are determined by the methods described in Ser. No. 251,171 are yield strength in tension, ultimate strength in tension, tensile modulus, yield strength in compression, ultimate strength in compression, compression modulus and ultimate shear strength. An additional characteristic called bearing strength is often determined.

While there are many other materials characteristics which are needed for special design purposes those enumerated above are the most usual ones and they form the basic collection of data needed in performing the usual types of stress analysis by mathematical techniques. Such techniques are adequate for the determination of the magnitude and direction of the principal stresses in pieces of uniform or uniformly varying cross sections. In practice many parts must of necessity be designed with cavities, openings, holes, sharp changes in section and other physical features which make it impracticable and often impossible to find the most critical stresses by a direct analytical process. It is for this reason that other methods are often employed using specimens or structural models representing the pieces being designed, such specimens or structural models being loaded and the effects of loading observed by special methods. One method available makes use of transparent models made from some type of plastic having what is known as a bifringent characteristic. Such models are stressed in a suitable loading device and are examined by means of an instrument called a polariscope. The polariscope device illustrated in FIGURES 3 through 7 of the present application is particularly adapted for cooperation with the materials testing fixture of Ser. No. 251,171 and the structures testing fixture of Ser. No. 257,962, the attendant specimens and structural models being manufactured from photoelastic materials and particularly bifringent plastics.

The elements of a plane polariscope in simplified form are shown in FIGURE 1. The reference numeral 10 designates a source of light, either plain white light or a monochromatic light such as emitted by a mercury vapor lamp. In the present device, both types of light may be used alternately and it is proposed to equip the instrument with the two light sources and a switching arrangement for selecting either as required. Reference numeral 11 designates a diffusion screen made of ground glass and reference numeral 12 designates a polarization plate. White light may be considered as traveling in straight lines but vibrating in waves transverse to the lines of propagation, these waves being great in number and distributed in many planes each including the line of propagation of the light energy. Polarization is accomplished by a transparent medium or plate which has the quality of extracting the components of all of these waves lying in a single plane, the light transmitted by the plate being called plane polarized light.

Reference numeral 13 designates an analyzer plate which is like the polarizer plate 12 and functions in the same way. Reference numeral 15 designates the structural model under test with a load as indicated at 16 and supports as indicated at 17 and 18, the model being made of a plastic which has the quality of accepting plane or linearly polarized light from the polarizer plate 12 and dividing the incident light into two component waves which are linearly polarized in directions at right angles to each other (the ordinary and extraordinary wave components). This quality is called double refraction and the material characteristic is termed birefringent or bifringent. Since plane polarized light vibrates in one direction only and a polarizer or an analyzer plate is capable of transmitting only vibrating light components which lie in the plane of transmission, two plates such as 12 and 13 oriented with their planes of transmission at right angles to each other will transmit no light at all unless a stressed bifringent model is in between. A loaded birefringent model will be stressed along two principal planes corresponding to the ordinary and extraordinary wave components, and these stresses are known as principal stresses which will in general differ in magnitude. This difference in material stress causes the light components passing through the model to travel at different velocities. As a consequence the emerging components, representative of the two principal stresses, have a phase difference proportional to the difference in magnitude of the stresses. The analyzer plate 13 must be oriented so that its plane of polarization is at right angles to the plane of polarization of the polarizer plate 12. As the two light components emerging from the model 15 pass through the analyzer plate 13 they each again become linearly polarized and a component of each of them emerges to become visible to the eye indicated at 20 or camera 21 or other suitable viewing means, the components now lying in one plane at 90° to the original plane of polarization of the linearly polarized light emerging from polarization plate 12. When a monochromatic light is used the visible pattern at the point of observation is a series of light and dark bands called isochromatics. The magnitude and direction of the principal stresses in the model are definite functions of certain characteristics of these isochromatics. The principal stress difference along any isochromatic band is constant and the character of the fringe patterns is a function of the actual stresses in the model.

In FIGURE 2, quarter wave plates 24 and 25 have been added to convert the instrument from a plane polariscope as in FIGURE 1 to a circular polariscope. The plates 24 and 25 have two perpendicular axes through which light may pass. It follows that there are only two planes in which vibrating components of light rays can exist coming out of such plates. When the phase difference between the components is equal to ¼ the wave-length of the light beam, the plate is called a quarter wave plate. When the planes of polarization of the quarter wave plate and the polarizer are placed at 45 degrees to each other the components of the original plane polarized light after passing through the quarter wave plate are combined to provide circularly polarized light. When this light emerges from a stressed bifringent model it will be oriented into two components again. The other quarter wave plate 25 is placed so that its plane of polarization is at 90 degrees to the first quarter wave plate 24. The components of light which emerge from the model 15 and pass through analyzer 13 and quarter wave plate 25 show up as isochromatics as in the plane polariscope of FIGURE 1.

Most stressed models will have points at which the axis of principal stress is parallel to the plane of vibration of the light ray. At such points the presence of the model has no effect on the light passing through, and in the plane polariscope of FIGURE 1 with the polarizer 12 and analyzer 13 at 90 degrees the light at these points will be extinguished. These dark areas in a plane polariscope appear as black bands superposed on the isochromatic patterns and they are called isoclinics. This superimposition confuses the pattern of isochromatics and it is desirable to eliminate them. This is the function of the quarter wave plates 24 and 25 of FIGURE 2. White light is usually employed when using the circular polariscope. In the circular polariscope, the components of light which are not affected by the bifringent model are extinguished just as all light in a plane crossed polariscope without a model. Consequently these isoclinic areas are no longer superimposed on the isochromatic pattern.

Figure 7:
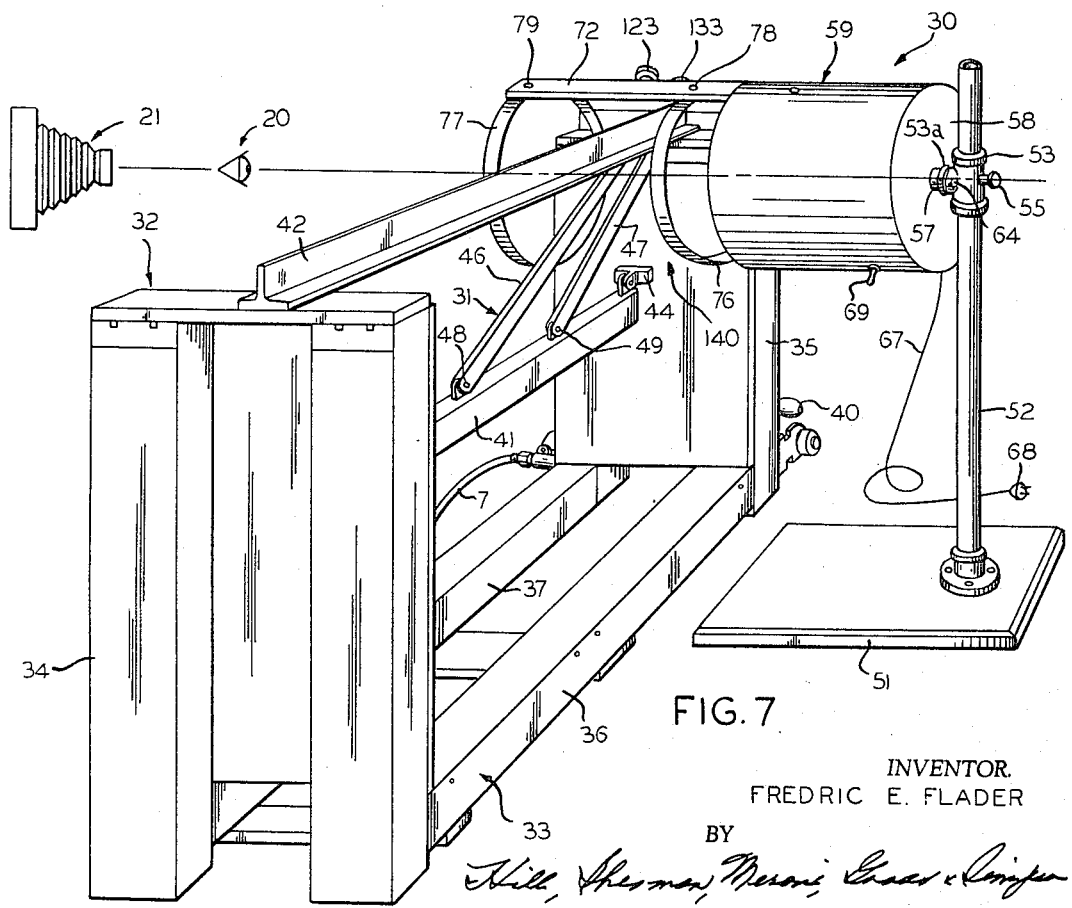
FIGURE 7 is a perspective view of the device showing its relationship to a structural model associated with a test fixture of the type shown in the sixth figure of the copending application Ser. No. 257,962.

Referring to FIGURE 7, a polariscope 30 in accordance with the present invention is shown in operative relation to a structural model 31 associated with a structural test fixture 32 corresponding to that shown in sixth figure of my copending application Ser. No. 257,962. The test fixture 32 includes a main frame 33 having integral and parallel spaced rigid uprights 34 and 35. These uprights are secured to base members 36 and 37. Associated with the base members 36 and 37 is a hydraulic load applying device (not shown) in the form of a conventional jack having an upwardly extensible and retractable piston rod. While any suitable source of energy may be provided for actuating the piston rod, a simple form of energy source may comprise a hand operated pump 40 connected by a hose 7 to the hydraulic jack. The hose may be provided with a conventional fluid pressure measuring gauge and may be provided with any conventional means or valving for effecting as desired the extension or retraction of the piston rod under hydraulic pressure. The disclosure of my copending application Ser. No. 257,962 is incorporated herein by reference to provide further description of suitable test fixtures and components for association with the polariscope 30.

The structural model 31 comprises a bar 41 partially suspended from a cross beam 42 carried by the uprights 34, 35. The bar 41 is pivotally supported by a bracket at 44 on column 35. The other end of this specimen 41 is free of support with the exception of intermediate diagonal lengths 46 and 47. The lower ends of the lengths 46 and 47 are pivotally attached at 48 and 49 to the top of the specimen or bar 41. The upper ends of the lengths are pivotally attached to a bracket fastened to the underside of the supporting beam 42. The hydraulic loading device is located near the upright 34 remote from the carrying bracket 44 and the piston rod carries a yoke-like fitting secured to the free end of the specimen or bar 41.

Referring to the polariscope 30 itself, as shown in FIGURE 7 a base 51 supports an upright tube 52. A sleeve 53 is slidable and rotatable on the tube 52 and may be fixed in a suitable vertical and angular position by means of a set screw indicated at 55. The sleeve 53 may be provided with a tubular fitting 53a receiving a shaft 57 secured to an end plate 58 of lamp housing 59 of the polariscope. The lamp housing 59 and associated parts are thus rotatable on a horizontal axis as indicated by arrow 60 in FIGURE 6 while the housing together with sleeve 53 are rotatable on a vertical axis as indicated by arrow 61 and are vertically adjustable as indicated by arrow 62. A set screw is indicated at 64 for fixing the housing 59 in a desired angular position with respect to the axis of shaft 57.

As shown in FIGURE 3, a lamp socket 65 may be secured to end wall 58 of the housing 59 for receiving a suitable source of light energy such as an ordinary white light bulb 66. As previously mentioned, a source of monochromatic light may also be provided within the housing 59 together with suitable selector means for selectively energizing either of the sources. An electric cord is indicated at 67 in FIGURE 7 having a plug 68 for connection to a suitable outlet to supply electric energy for the light source 66. A switch is indicated at 69 for turning the light source on and off.

As best seen in FIG. 3, a tie plate 72 is secured to housing 59 by a suitable fastening means as indicated at 73 and 74 in front of a suitable screen 75 which may be made of ground glass as previously described. A pair of mounting rings 76 and 77 are secured to the supporting plate 72 by fastening means indicated at 78 and 79. The rings 76 and 77 have series of rollers such as rollers 80, 81 on axis pin 82 and rollers 83, 84 on axis pin 85 shown in FIGURE 3. As seen in FIGURE 6, each ring 76 and 77 has a series of axis pins 82, 88 and 89 and 85, 90 and 91 at equally spaced intervals about the rings. A roller 92 on pin 86, a roller 93 on pin 89 and a roller 94 on pin 91 are also visible in FIGURE 6.

Each set of rollers such as rollers 81, 92 and 93 in FIGURE 6 supports a circular frame, the circular frames being designated by reference numerals 101—104 in FIGURE 3. The frames carry suitable polarizing plates as previously described, for example a polarizing plate 105, a quarter wave plate 106, a quarterwave plate 107 and an analyzer plate 108 in correspondence with the arrangement described in connection with FIGURE 2.

As best seen in FIGURE 4, each of the frames 101–104 is provided with a cylindrical recess area as indicated at 101a and 102a in FIGURE 4 receiving rollers 80 and 81 and the other rollers of the respective sets. Adjacent the recesses, the circular frames are provided with peripheral gear teeth as indicated at 101b and 102b in FIGURE 4 meshing with respective pinion gears as indicated at 110 and 111 and 112 and 113 in FIGURE 3.

As seen in FIGURES 3 and 5, pinion 110 is carried on a shaft 115 which is supported by a depending leg 72a of support member 72 and carries a bevel gear 116 at the inner end thereof. Similarly gear 113 is carried on a shaft 117 supported in an aperture in depending leg 72b of support member 72 and having a bevel gear 118 at the inner end thereof. Bevel gears 116 and 118 mesh with a horizontal bevel gear 120 carried on a shaft 122 associated with a knob 123. Thus, rotation of knob 123 will drive shafts 115 and 117 in opposite directions of rotation so as to rotate plates 105 and 108 in opposite directions. This provides a particularly advantageous means for manual adjustment of the angular relationship between the axes of polarization of the plates 105 and 108.

Gears 111 and 112 are located on shafts corresponding to shafts 115 and 117 and are manually adjusted by means of a knob 133 acting through gearing identical to the gearing 120, 116, 118 shown in FIGURE 3 to oppositely rotate the plates 106 and 107. The plates 106 and 107 are thus independently rotatable with respect to plates 105 and 108 but are rotated in opposite directions simultaneous by means of the knob 133.

By way of example, mounting rings 76 and 77 may be formed in two parts as indicated at 76a, 76b and 77a, 77b facilitate removal of the frames 101–104. The ring sections 76b and 77b may be secured to the remainders of the rings by fastening means such as indicated at 130 which upon removal enable the set of wheels such as 81, 92, 93 to be removed from axis pins 82, 88, 89. A spacer ring such as indicated at 131 may be interposed between frames 101 and 102 as indicated in FIGURE 4, and a corresponding spacer ring may be interposed between frames 103 and 104. The spacer ring 131 maintains the frames 101 and 102 in position on the bearing wheels such as 80 and 81 while readily accommodating relative rotation between the frames. Suitable bearing means may be inserted in the apertures 72c, 72d of legs 72a, 72b if desired to position the shafts 115 and 117 with their gears 116 and 118 in meshing relationship to gear 120. The gears such as 110 and 113 may be of sufficient weight to maintain engagement with the peripheral teeth such as 101b, FIGURE 5, and may be shiftable slightly in the vertical direction to facilitate removal of the frames such as 101 and 102. The same arrangement may be provided with respect to gears 111 and 112.

In operation, a specimen such as indicated at 31 in FIGURE 7 of photoelastic material such as a bifringent plastic is placed on the fixture 32. Stress is progressively applied to the test model 31 for example by means of the hand operated pump 40, FIGURE 7, while observing the transmitted light pattern as indicated diagrammatically at 20 or 21 in FIGURE 7.

The disclosures of copending applications Ser. No. 251,171 and 257,962 are incorporated herein by reference as disclosing a number of different test fixtures and structural models with which the polariscope 30 may be effectively associated. Of course, the materials and structural models are to be of photoelastic material so that the stresses set up herein may be observed by means of the polariscope 30. The polariscope 30 as indicated in FIGURES 3, 6 and 7 is provided with an open throat at 140 which greatly facilitates the utilization of the device with the various test fixtures such as 32, particularly in view of the adjustability of the device as indicated by arrows 60–62 in FIGURE 6.

It will be understood that the model 15 has been shown diagrammatically in FIGURES 1 and 2 and that normally the long axis of a specimen would be mounted at right angles to the axis of the polariscope to obtain a view of the strain pattern.

As an example of a modification of the illustrated embodiment, the peripheral gear teeth on the retaining rings 101, 102, 103 and 104 may be omitted together with the associated pinions 110–113, the actuating shafts, gearing and knobs 123, 133; in place of these parts simple buttons or studs may be fastened to each of the rings 101–104 to provide for manual rotation of the plates 105–108 individually to secure the correct orientation.

The illustrated apparatus may also be mounted in a vertical position by securing the end plate 58 of housing 59 and associated parts to a horizontal base by means of a vertically disposed fitting adaptable to fitting 57. With the apparatus in a vertical orientation, a trough may extend horizontally through the space 140, FIGURE 3, which trough may have a flat bottom formed by a rectangular glass plate. A pipe may extend horizontally across the width of the trough at one end and have a series of holes opening horizontally so as to direct a liquid along the trough from the one end through the field of the polariscope to the opposite end of the trough. A reservoir may receive the liquid at the opposite end of the trough and recirculate the liquid by means of a pump immersed in the fluid of the reservoir. A model may be inserted on the glass plate of the trough, for example, in alignment with the vertical axis of the polariscope with the axis of the polariscope intersecting the central part of the width dimension of the trough. For example, the model may be a cylinder with its axis vertical and coincident with the axis of the polariscope. The assembly is completed by a gate upstream of the model hinged and provided with a lever for angular adjustment so that the angle and depth of penetration of the gate below the surface of the liquid in the trough may be regulated.

The liquid or fluid must have a special property such as water in which certain lightweight particles are held in suspension, the combination forming an emulsion-like mixture in which the suspended matter is nearly invisible when the fluid is at rest. When the fluid is in motion and travelling along the length of the trough, and when viewed through a polariscope as previously described in connection with stressed plastic models, the suspended particles provide the birefringent or bifringent quality present in photoelastic plastics and this property of the fluid develops dramatic and interesting visible flow patterns around objects which are immersed or partly immersed in the stream. One such fluid mixture which has been tried with success is a mixture of water and gelatin. It is anticipated that other colloidal mixtures will serve the purpose as well.

In operation the fluid mixture is circulated by the pump to the inlet end of the trough and is spread out over the width of the trough. The gate forces the fluid to run beneath it and rising again on the downstream side the fluid proceeds toward the model in a smooth laminar flow stream. As the fluid nears the model it divides to flow around the cylinder model and is disturbed and caused to form swirls and eddies downstream of the model. The particular pattern associated with a round object such as a cylinder is known as "Karmens Street." The velocity of the fluid in passing around the model is increased since the passage area is smallest at the maximum diameter of the model. The increase in velocity accompanied by an increase in the number of particles moving with and within the fluid per unit cross sectional area of flow causes the optical properties (index of refraction) to change in much the same manner as the optical properties of a stressed bifringent solid plastic model are changed, in the latter case making strain patterns visible through the use of the polariscope. In a certain sense the alteration of the flow pattern in a moving fluid under the conditions described may be considered to represent changed internal stress conditions in the fluid.

Another dramatic use of the photoelastic effect involves the use of a dam in the trough and extending across the width of the trough at the point of intersection of the vertical axis of the polariscope with the trough. The dam may be molded of gelatin, its initial configuration being straight across the width dimension of the trough. Blocks may be provided at the upstream and downstream faces of the dam at each side thereof which are anchored to the sides of the trough to retain the opposite edges of the dam. The trough may be filled or partially filled with fluid. In a static non-flowing condition, the fluid will exert a pressure on the upstream face of the dam which will cause its upstream face and its downstream face to bend. The bottom of the dam at the downstream side may be anchored by means of a bar extending across the width of the channel and secured to the glass plate or sides of the trough so that the deflection will be progressive from no deflection at the bottom of the dam to a maximum at the top of the dam. The strain when viewed through the polariscope exhibits fringe patterns in the same way as a normal bifringent plastic model under stress.

The dynamic effect of a wavefront striking the dam may also be observed. In this case a wave progressing downstream may strike the dam producing a dramatic bending effect on the dam which can be studied and analyzed with the aid of high speed photography. This effect may be studied with the polariscope in a horizontal condition so that its axis intersects the cross section of the dam and extends across the width dimension of the trough.

It will be apparent that many modifications and variations may be effected without departing from the scope of the novel concepts of the present invention.

I claim:

1. A portable educational testing apparatus for illustrating stress in photoelastic materials comprising a stand having an upright member extending therefrom, a housing secured to said upright member and adjustable vertically along said member and horizontally about the axis of said member and being rotatable on its own axis, a source of light energy in said housing and means for projecting light energy along a given path, said housing having a horizontally extending supporting member extending along and to one side of the path of the light energy with a pair of mounting rings secured to said supporting member and extending therefrom in encircling relation to said path, said rings having an open space therebetween with an extent in the direction along said path approximating the diametric extent of said rings and said space being unobstructed at the side thereof opposite said supporting means to accommodate receipt of a test specimen into said space, one of said rings carrying a polarizer plate and a quarter wave plate for rotation about the axis of said path, the other of said rings carrying an analyzer plate and a quarter wave plate for rotation about the axis of said path, common manually operable means for conjointly oppositely rotating said polarizer and analyzer plate, and common manually operable means for conjointly and oppositely rotating said quarter wave plates.

2. A portable educational testing apparatus for illustrating stress in photoelastic materials comprising a stand having an upright member extending therefrom, a housing secured to said upright member and being rotatable on its own axis, a source of light energy in said housing and means for projecting light energy along a given path, said housing having a horizontally extending supporting means extending along and to one side of the path of the light energy with a pair of plate mounting means secured to said supporting means and extending therefrom in encircling relation to said path, said pair of plate mounting means providing an open space therebetween, said space being unobstructed at the side thereof opposite said supporting means to accommodate receipt of a test specimen into said space, one of said plate mounting means carrying a polarizer plate and a quarter wave plate for rotation with respect to the axis of said path, the other of said plate mounting means carrying an analyzer plate and a quarter wave plate for rotation about the axis of said path, common operable means for conjointly and oppositely rotating said polarizer and analyzer plate, and means for conjointly and oppositely rotating said quarter wave plates.

3. A portable educational testing apparatus for illustrating stress in photoelastic materials comprising a stand having an upright member extending therefrom a housing adjustably secured to said upright member, at least a portion of said housing being rotatable on its own axis, a source of light energy in said housing and means for projection of light energy along a given path, said housing having a horizontally extending supporting means extending parallel to and displaced from the path of the light energy, first and second ring means secured to said supporting means and extending therefrom in encircling relation to said path of light energy, said first and second ring means being disposed on said supporting means in generally parallel spaced relation, the spacing of the first and second ring means on the supporting means providing an unobstructed zone extending from the supporting means across said path of light energy to accommodate receipt of a test specimen in said zone, said first ring means carrying a polarizer plate and a quarter wave plate, said second ring means carrying an analyzer plate and a quarter wave plate, first manually operable means for selectively rotating said polarizer plate with respect to said analyzer plate about the axis of said path of light energy and relative to said quarter wave plates to adjust the light energy transmission through the plates of the apparatus according to predetermined conditions, and second manually operable means for selectively rotating conjointly and oppositely said quarter wave plates to permit the predetermined adjustment of the transmission of light energy along the path thereof through the plates of the apparatus in accordance with stress conditions produced in photoelastic specimens being tested.

4. A portable educational testing apparatus for illustrating stress in photoelastic materials comprising a stand having a mounting member extending therefrom, a housing adjustably secured to said mounting member, at least a portion of said housing being rotatable on its own axis relative to the mounting member, a source of light energy in said housing and means for projection of light energy along a predetermined path, said housing having a horizontally extending supporting means extending parallel to and displaced from the path of the light energy, first and second plate mounting means secured to said supporting means and extending therefrom in a direction substantially normal to the path of light energy without obstructing said path, said first and second plate mounting means being disposed on said supporting means and having portions thereof disposed in generally parallel spaced relation, the spacing of the first and second plate mounting means portions on the supporting means providing an unobstructed zone extending from the supporting means across said path of light energy to accommodate receipt of a test specimen in said zone, said first plate mounting means carrying a polarizer plate and a quarter wave plate, said second plate mounting means carrying a quarter wave plate and an analyzer plate, manually operable means for selectively rotating conjointly and oppositely said polarizer and said analyzer about the axis of said path of light energy and relative to said quarter wave plates to adjust the light energy transmission through the plates of the apparatus according to predetermined conditions, and manually operable means for selectively rotating said quarter wave plates to permit the predetermined adjustment of the transmission of light energy along the path thereof through the plates of the apparatus in accordance with stress conditions produced in the photoelastic specimens being tested.

References Cited

UNITED STATES PATENTS

| | | | |
|---|---|---|---|
| 1,766,037 | 6/1930 | Dawson | 310—9.5 |
| 1,989,691 | 2/1935 | Hirt | 350—95 |
| 2,730,007 | 1/1956 | Chapman | 350—157 |

FOREIGN PATENTS 946,695  5/1947  France.

JEWELL H. PEDERSEN, *Primary Examiner.*

W. A. SKLAR, *Assistant Examiner.*